United States Patent
Hobaugh, II

(10) Patent No.: US 6,546,828 B2
(45) Date of Patent: Apr. 15, 2003

(54) APPARATUS FOR CONNECTING A VEHICLE STEERING WHEEL TO A STEERING SHAFT

(75) Inventor: James M. Hobaugh, II, Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/798,202

(22) Filed: Mar. 2, 2001

(65) Prior Publication Data

US 2002/0124681 A1 Sep. 12, 2002

(51) Int. Cl.$^7$ .............................. B62D 1/04; G05G 1/10
(52) U.S. Cl. .................... 74/552; 403/259; 403/261; 403/370
(58) Field of Search ................... 74/552, 548; 403/370, 403/259, 261; 411/359

(56) References Cited

U.S. PATENT DOCUMENTS

| | | | | |
|---|---|---|---|---|
| 427,244 A | * | 5/1890 | Stone | 403/259 |
| 1,029,950 A | * | 6/1912 | Schulz | 403/259 |
| 1,495,654 A | * | 5/1924 | Tietz | 403/259 |
| 1,797,296 A | * | 3/1931 | Ray | 403/259 |
| 3,893,776 A | * | 7/1975 | Beattie | 403/259 |
| 4,306,466 A | * | 12/1981 | Coveney | 403/259 |
| 4,433,877 A | * | 2/1984 | Colanzi | 403/259 |
| 4,576,503 A | * | 3/1986 | Orain | 403/261 |
| 4,624,596 A | * | 11/1986 | Eckendorff | 403/259 |
| 4,652,168 A | * | 3/1987 | Brandenstein | 403/259 |
| 4,819,961 A | * | 4/1989 | Henigue | 74/552 |
| 4,938,094 A | * | 7/1990 | Cochard | 74/552 |
| 5,002,422 A | * | 3/1991 | Schremmer et al. | 74/552 |
| 5,144,861 A | | 9/1992 | Nishijima et al. | |
| 5,172,607 A | * | 12/1992 | Wu | 180/287 |
| 5,176,043 A | * | 1/1993 | Eckendorff | 74/552 |
| 5,190,393 A | | 3/1993 | Svensson | |
| 5,308,183 A | * | 5/1994 | Stegeman et al. | 403/258 |
| 6,076,425 A | * | 6/2000 | Worrell et al. | 74/552 |

* cited by examiner

Primary Examiner—Jack Lavinder
Assistant Examiner—Robert A. Siconolfi
(74) Attorney, Agent, or Firm—Tarolli, Sundheim, Covell & Tummino L.L.P.

(57) ABSTRACT

An apparatus (10) includes a steering shaft (12) rotatable to turn steerable vehicle wheels. A steering wheel (14) has a hub (40) for connection to an axial end (20) of the steering shaft (12). The hub (40) has a tapered surface (50) defining an opening (42) into which the axial end (20) of the steering shaft (12) extends. A collet (60) has a tapered radially outer surface (64) engageable with the tapered surface (50) of the hub (40). The collet (60) also has a radially inner surface (62) engageable with the axial end (20) of the steering shaft (12). A fastener (80) connects the steering wheel (14) to the steering shaft (12). The fastener (80) applies force to the collet (60) to force the radially outer tapered surface (64) of the collet into engagement with the tapered surface (50) defining the opening (42) in the hub (40).

10 Claims, 2 Drawing Sheets

APPARATUS FOR CONNECTING A VEHICLE STEERING WHEEL TO A STEERING SHAFT

FIELD OF THE INVENTION

The present invention relates to an apparatus for connecting a vehicle steering wheel to a steering shaft.

BACKGROUND OF THE INVENTION

A conventional apparatus for connecting a steering wheel to a vehicle steering shaft includes an opening in a hub of the steering wheel which receives an end portion of the steering shaft. A set screw is supported in a radially extending bore in the hub of the steering wheel. The set screw engages the end of the steering shaft to hold the steering wheel on the steering shaft.

SUMMARY OF THE INVENTION

In accordance with the present invention, an apparatus includes a steering shaft rotatable to turn steerable vehicle wheels. A steering wheel has a hub for connection to an axial end of the steering shaft. The hub has a tapered surface defining an opening into which the axial end of the steering shaft extends. A collet has a tapered radially outer surface engageable with the tapered surface of the hub and a radially inner surface engageable with the axial end of the steering shaft. A fastener connects the steering wheel to the steering shaft. The fastener applies force to the collet to force the radially outer tapered surface of the collet into engagement with the tapered surface defining the opening in the hub.

BRIEF DESCRIPTION OF THE INVENTION

The foregoing and other features of the present invention will become apparent to one skilled in the art to which the present invention relates upon consideration of the following description of the invention with reference to the accompanying drawings, wherein.

DESCRIPTION OF THE INVENTION

Figure 1:
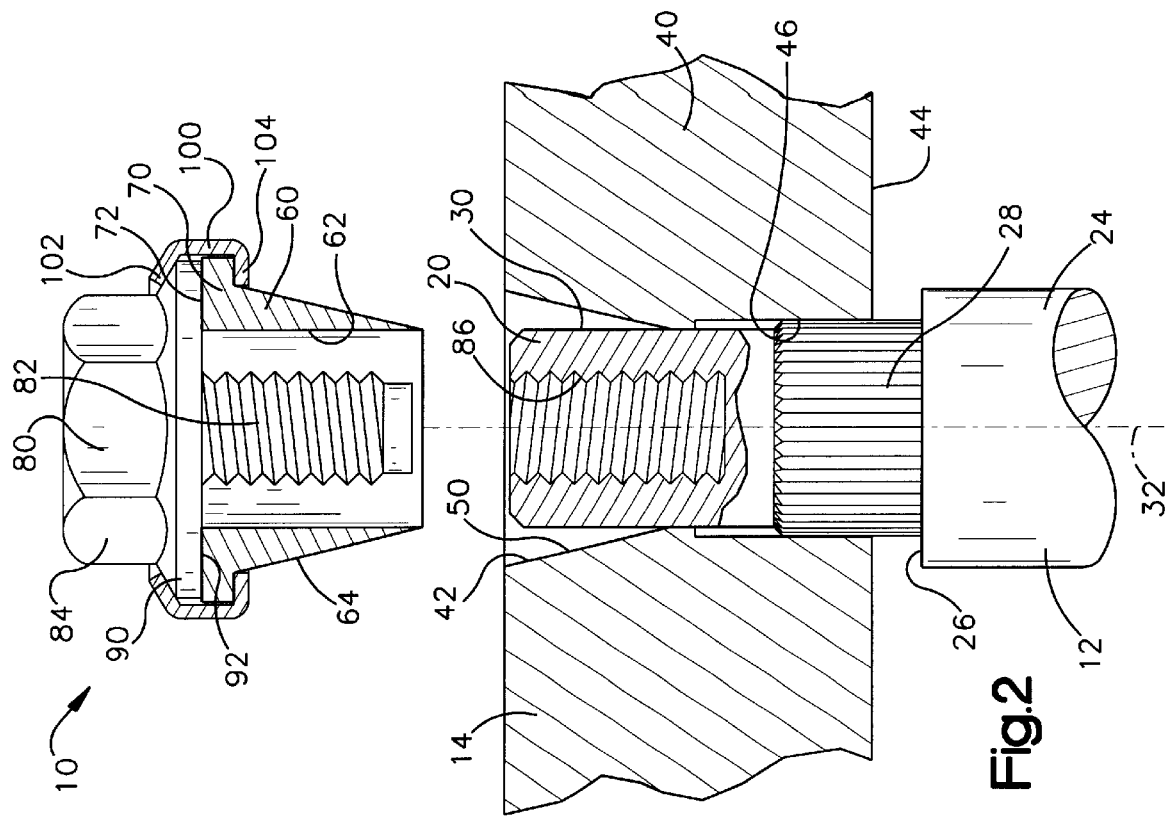
FIG. 1 is a sectional view of an apparatus in accordance with the present invention showing a steering wheel connected to a steering shaft.

The present invention relates to the attachment of a vehicle steering wheel to a steering shaft of a vehicle. As representative of the present invention, FIG. 1 illustrates an apparatus 10 including a vehicle steering shaft 12 and a steering wheel 14.

The steering shaft 12 is part of a steering column of a vehicle. The steering shaft 12 has an axial end 20 and a main portion 24. The axial end 20 has a diameter less than a diameter of the main portion 24. Accordingly, the steering shaft 12 has an annular shoulder 26 from which the axial end 20 extends.

The axial end 20 (FIGS. 1 and 2) of the steering shaft 12 has external splines 28 extending from the shoulder 26. The end 20 has a cylindrical outer surface 30 centered on an axis 32 of the steering shaft 12. The steering shaft 12 is supported for rotation about the axis 32.

Figure 2:
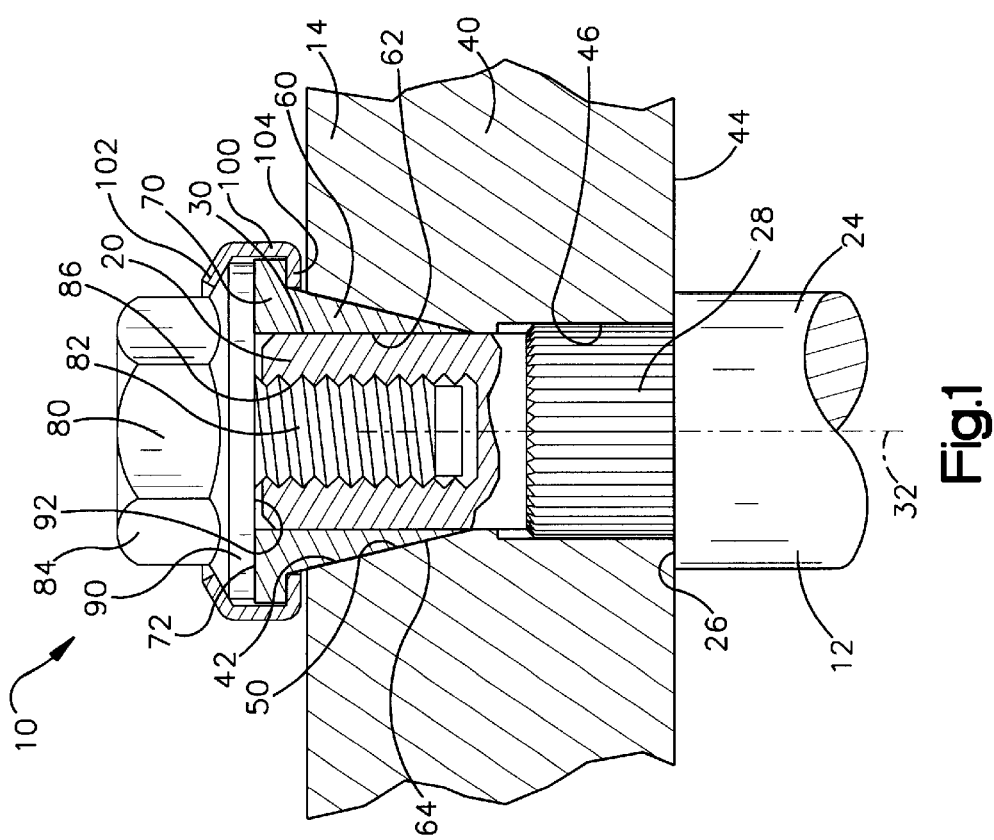
FIG. 2 is a sectional view of the apparatus of FIG. 1 showing the steering wheel disconnected from the steering shaft.

The steering wheel 14 includes a hub 40, a portion of which is shown in FIG. 1. The hub 40 has an opening 42 centered on the axis 32. A lower surface 44 of the hub 40 engages the shoulder 26 on the steering shaft 12. The hub 40 has internal splines 46 engaging the splines 28 on the steering shaft 12. The opening 42 is defined by a tapered or frustoconical surface 50.

Figure 3:
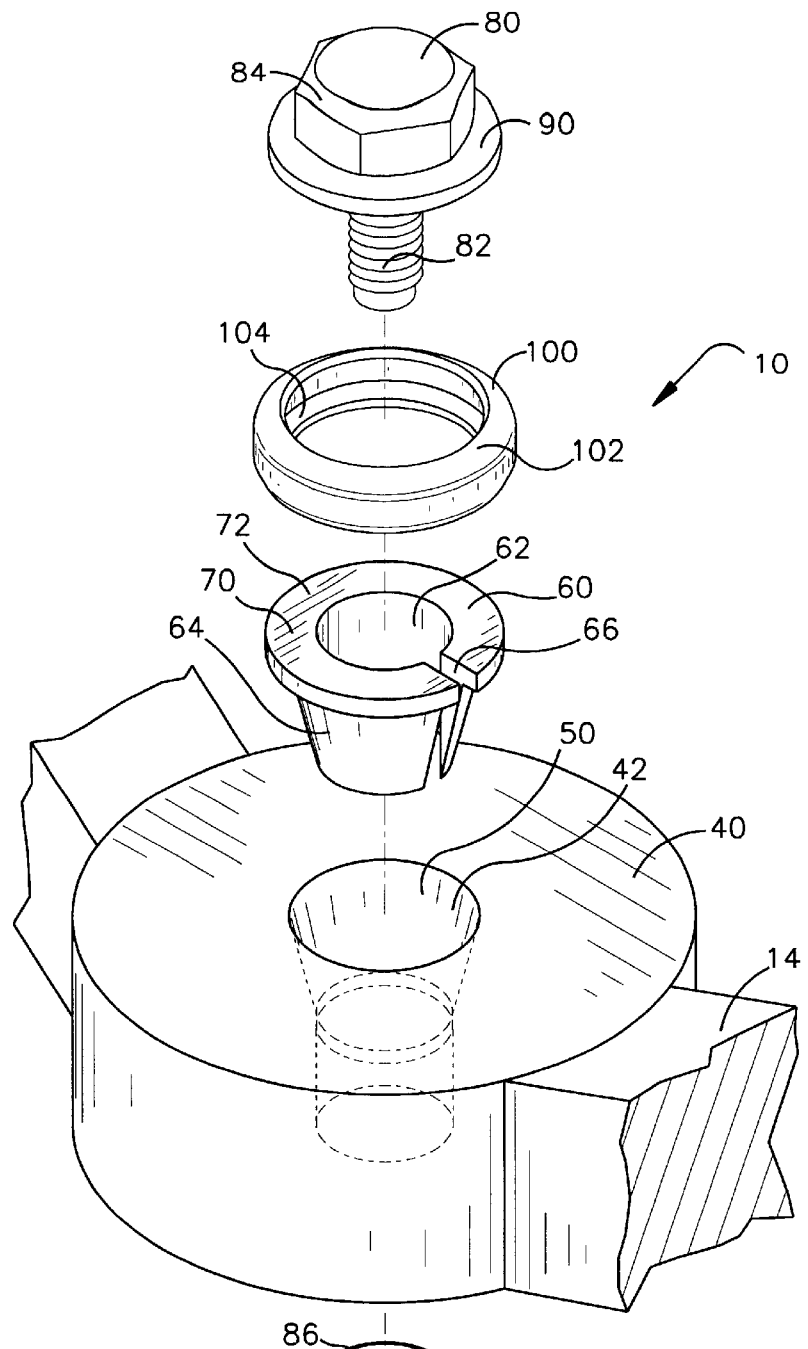
FIG. 3 is an exploded perspective view of the apparatus of FIG. 1.

A radially expandable collet 60 (FIG. 1) engages the cylindrical surface 30 on the steering shaft 12 and the tapered surface 50 on the hub 40 to connect the steering wheel 14 to the steering shaft. The collet 60 (FIG. 3) includes a radially inner cylindrical surface 62 and a radially outer tapered surface 64. The surface 62 (FIGS. 1 and 2) engages the cylindrical surface 30 on the axial end 20 of the steering shaft 12 and the tapered surface 64 engages the tapered surface 50 of the hub 40.

The collet 60 (FIG. 3) has an axially extending slot 66 to permit radial expansion of the collet. The inner surface 62 of the collet 66 has a diameter less than the diameter of the surface 30 prior to expansion of the collet 60. The collet 60 includes a radially extending lip 70. The lip 70 is partially defined by an axial end surface 72 of the collet 60.

A fastener or bolt 80 (FIGS. 1–3) forces the collet 60 into engagement with the steering shaft 12 and the steering wheel 14. The bolt 80 has a threaded shaft 82 and a head 84. The shaft 82 of the bolt 80 threadably engages a threaded opening 86 in the axial end 20 of the steering shaft 12. The head 84 engages the collet 60.

The head 84 of the bolt 80 has a radially extending flange 90. The flange 90 (FIGS. 1 and 2) is partially defined by a radially extending surface 92. The surface 92 is engageable with the surface 72 of the collet 60 to apply an axial force to the collet. A cap 100 captures the collet 60 to the bolt 80. The cap 100 engages the lip 90 on the bolt 80 and the lip 70 on the collet 60. Accordingly, upon removal of the bolt 80 from the shaft 12, the collet 60 moves with the bolt relative to the shaft.

The cap 100 has an upper portion 102 extending radially inwardly. The upper portion 102 engages the flange 90 on the bolt 80. A lower portion 104 of the cap 100 extends radially inwardly and engages the lip 70 on the collet 60. The upper portion 102 engages the flange 90 and the lower portion 104 engages the lip 70 to capture the collet 60 to the bolt 80.

When the steering wheel 14 is to be connected to the steering shaft 12, the hub 40 is placed over the axial end 20 of the shaft so that the axial end extends into the opening 42 in the hub. The bolt 80 is threaded into the opening 86 in the shaft 12 to apply an axially-directed force to the collet 60. The surface 62 of the collet 60 engages the surface 30 of the shaft 12 to radially expand the collet and force the tapered surface 64 of the collet into engagement with the tapered surface 50 of the hub 40.

When the hub 40 is to be removed from the shaft 12, the bolt 80 is unscrewed from the opening 86 in the shaft. When the bolt 80 is unscrewed from the shaft 12, the lip 90 of the bolt applies an axially-directed force to the cap 100. The cap 100 transfers the axially-directed force to the lip 70 of the collet 60. Accordingly, upon unscrewing of the bolt 80 from the opening 86 in the shaft 12, the collet 60 is removed from the opening 42 in the hub 40. Therefore, the steering wheel 14 can easily be removed from the shaft 12 if needed.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:

a steering shaft rotatable about an axis to turn steerable vehicle wheels, said steering shaft having an axial end with a cylindrical outer surface;

a steering wheel having a hub for connection to said axial end of said steering shaft, said hub having a tapered surface defining an opening into which said axial end of said steering shaft extends;

a collet having a radially tapered outer surface engageable with said tapered surface of said hub and a cylindrical inner surface engageable with said cylindrical outer surface of said axial end of said steering shaft; and a fastener connecting said steering wheel to said steering shaft, said fastener applying an axial force to said collet to force said radially tapered outer surface of said collet into engagement with said tapered surface defining said opening in said hub, said fastener further applying the axial force to said collet to radially force said cylindrical inner surface of said collet into engagement with said cylindrical outer surface of said axial end of said steering shaft.

2. An apparatus as defined in claim 1 wherein said fastener threadably engages said steering shaft.

3. An apparatus as defined in claim 2 wherein said steering shaft includes an internally threaded portion and said fastener has an externally threaded portion engaging said internally threaded portion of said steering shaft.

4. An apparatus as defined in claim 1 wherein said collet is radially expandable.

5. An apparatus as defined in claim 4 wherein said collet has an axial slot to permit radial expansion of said collet.

6. An apparatus as defined in claim 1 wherein said fastener applies an axially directed force to a lip of said collet.

7. An apparatus as defined in claim 1 wherein said hub includes first splines engageable with corresponding second splines on said axial end of said steering shaft, said first and second splines being axial offset from said collet and said fastener.

8. An apparatus comprising:

a steering shaft rotatable about an axis to turn steerable vehicle wheels;

a steering wheel having a hub for connection to an axial end of said steering shaft, said hub having a tapered surface defining an opening into which said axial end of said steering shaft extends;

a collet having a radially tapered outer surface engageable with said tapered surface of said hub and a inner surface engageable with said axial end of said steering shaft;

a fastener connecting said steering wheel to said steering shaft, said fastener applying force to said collet to force said radially tapered outer surface of said collet into engagement with said tapered surface defining said opening in said hub; and a cap engaging said collet and said fastener to capture said collet to said fastener such that said collet moves with said fastener relative to said steering shaft upon removal of said fastener from said steering shaft.

9. An apparatus as defined in claim 8 wherein said collet includes a radially extending lip engaging said cap and said fastener includes a radially extending flange engaging said cap.

10. An apparatus comprising:

a steering shaft rotatable about an axis to turn steerable vehicle wheels, said steering shaft having an axial end;

a steering wheel having a hub for connection to said axial end of said steering shaft, said hub having a tapered surface defining an opening into which said axial end of said steering shaft extends;

a collet having a radially tapered outer surface engageable with said tapered surface of said hub and a inner surface engageable with said axial end of said steering shaft, said collet being radially expandable and contractible, said inner surface of said collet having a diameter less than an outer diameter of said axial end of said steering shaft such that said inner surface expands as said collet is positioned on said axial end of said steering shaft; and a fastener connecting said steering wheel to said steering shaft, said fastener applying force to said collet to force said radially tapered outer surface of said collet into engagement with said tapered surface defining said opening in said hub thereby causing said inner surface of said collet to clamp around said axial end of said steering shaft.

* * * * *